(12) United States Patent
Staud et al.

(10) Patent No.: US 10,295,891 B2
(45) Date of Patent: May 21, 2019

(54) REFRIGERATION APPLIANCE WITH ICE AND WATER DISPENSER AND METHOD OF OPERATING THE APPLIANCE

(71) Applicant: BSH-HAUSGERAETE GMBH, Munich (DE)

(72) Inventors: Ralph Staud, Munich (DE); Thomas Tischer, Haar (DE); Marco Reitwiessner, Munich (DE); Andreas Kessler, Munich (DE); Andreas Korte, Munich (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/964,508

(22) Filed: Apr. 27, 2018

(65) Prior Publication Data

US 2018/0314142 A1    Nov. 1, 2018

(30) Foreign Application Priority Data

Apr. 28, 2017    (DE) .......... 10 2017 207 278

(51) Int. Cl.
| | | |
|---|---|---|
| G03B 21/20 | (2006.01) | |
| F25D 27/00 | (2006.01) | |
| G03B 21/56 | (2006.01) | |
| F25C 5/20 | (2018.01) | |

(52) U.S. Cl.
CPC .......... *G03B 21/2033* (2013.01); *F25D 27/00* (2013.01); *G03B 21/56* (2013.01); *F25C 5/22* (2018.01); *F25C 2400/10* (2013.01); *F25D 2400/36* (2013.01); *F25D 2700/06* (2013.01)

(58) Field of Classification Search
CPC .......... G03B 21/145; G03B 21/2013; G03B 21/608; G03B 21/2033; F25D 23/028; F25D 23/126; H05K 7/00; H05K 7/0017

See application file for complete search history.

(56) References Cited

U.S. PATENT DOCUMENTS

| | | | | |
|---|---|---|---|---|
| 6,715,302 | B2 * | 4/2004 | Ferragut, II | F25D 29/00 236/94 |
| 7,404,298 | B2 * | 7/2008 | Kim | F25D 23/12 248/27.1 |
| 2008/0165476 | A1 * | 7/2008 | McCoy | F25D 23/12 361/728 |
| 2008/0165509 | A1 * | 7/2008 | Kendall | F25D 23/028 361/735 |
| 2009/0193760 | A1 * | 8/2009 | Leclear | B65B 31/046 53/434 |
| 2012/0281152 | A1 * | 11/2012 | Nemeth | G03B 21/608 348/744 |

\* cited by examiner

*Primary Examiner* — Sultan Chowdhury
(74) *Attorney, Agent, or Firm* — Laurence A. Greenberg; Werner H. Stemer; Ralph E. Locher

(57) ABSTRACT

A refrigeration appliance has an ice and water dispenser with a container receptacle. The refrigeration appliance has a light projector for projecting information into the container receptacle. A method serves to operate a refrigeration appliance, in which information is projected into a container receptacle of an ice and water dispenser by a light projector.

12 Claims, 3 Drawing Sheets

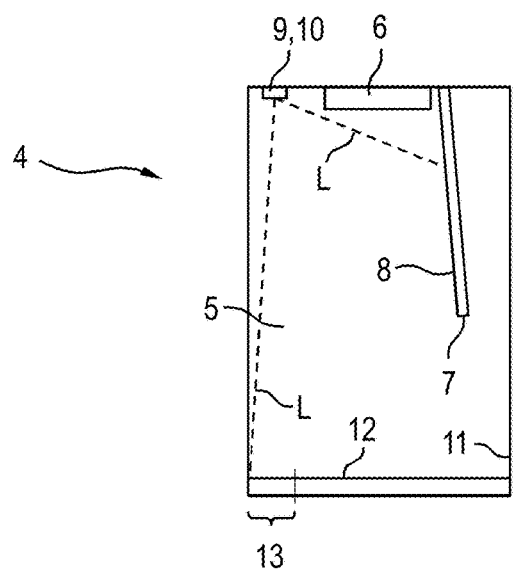
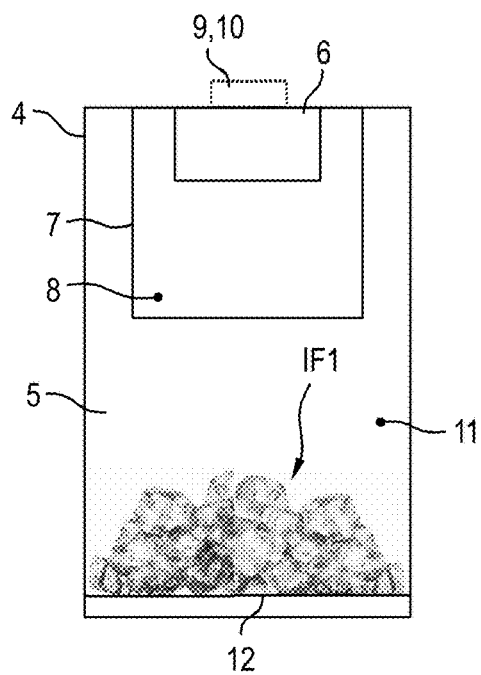
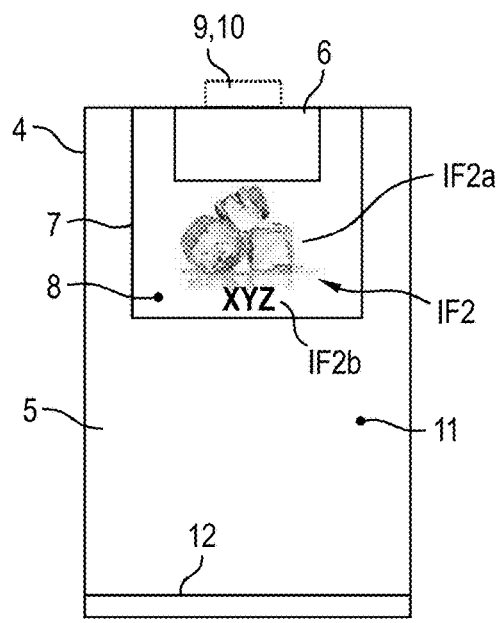
Fig.2A
Fig.2B
Fig.2C

REFRIGERATION APPLIANCE WITH ICE AND WATER DISPENSER AND METHOD OF OPERATING THE APPLIANCE

CROSS-REFERENCE TO RELATED APPLICATION

This application claims the priority, under 35 U.S.C. § 119, of German application DE 10 2017 207 278.4, filed Apr. 28, 2017; the prior application is herewith incorporated by reference in its entirety.

BACKGROUND OF THE INVENTION

Field of the Invention

The invention relates to a refrigeration appliance, which has an ice and water dispenser with a container receptacle. The invention also relates to a method for operating a refrigeration appliance of this type. The invention can be applied particularly advantageously to refrigerators with an ice and water dispenser on the door side Refrigerators which have an ice and water dispenser (IWD) on a front panel of a door are known. The ice and water dispenser typically has a container receptacle which is accessible from the outside, into which at least one output opening projects at the top. Water or ice can be released into the container receptacle through the output opening. The container receptacle can receive a container, which receives the dispensed water or ice. It is known to homogeneously illuminate the container receptacle using a lamp. In order to operate the ice and water dispenser, a control panel may exist on the front panel of a door adjacent to the container receptacle. This can be embodied as a touch-sensitive operator panel or "touch field". An output mode can be set on the control panel, in order to dispense water in the desired form. Output modes can comprise the output forms "uncooled water", "cooled water", ice cube" or "crushed ice" or be assigned to such output forms, for instance.

SUMMARY OF THE INVENTION

It is the object of the present invention to at least partially overcome the disadvantages of the prior art and, in particular, to provide an ice and water dispenser of a refrigeration appliance, which can be realized in a particularly compact manner and can be operated in a user-friendly manner.

This object is achieved according to the features of the independent claims. Preferred embodiments can be inferred in particular from the dependent claims.

The object is achieved by a refrigeration appliance, having an ice and water dispenser with a container receptacle, wherein the refrigeration appliance has a light projector for projecting information into the container receptacle.

Such a refrigeration appliance is advantageous in that the information can be displayed practically directly at the site of the release of water, ice, etc. This provides increased clarity for a user and is thus more user-friendly. Since, in contrast to presenting information on electrically operated displays, the information is light-based, it is not susceptible to moisture and is thus particularly reliable. Furthermore, the information then no longer needs to be displayed outside of the container receptacle, so that space can be saved for control or operator panels. This in turn enables a particularly compact and cost-effective design and also a particularly high-quality impression of the refrigeration appliance. Moreover, the projection facility only requires minimal installation space and moreover only minimal cabling. Compared with monitors, it is furthermore very cost-effective. Furthermore, the projection yields a particularly high design flexibility.

The refrigeration appliance is in particular a domestic refrigeration appliance. The refrigeration appliance may be a refrigerator, a freezer, a keep-fresh appliance or any combination thereof. The refrigeration appliance may be a dual refrigeration appliance with two refrigerating zones arranged adjacent to one another, wherein the refrigerating zones can be closed by a swing door.

The ice and water dispenser has in particular a container receptacle or output depression (which can possibly be closed by a flap), which can be accessed on the outside and into which on the top side at least one output opening for ice and/or water projects or leads. The ice and water dispenser is in particular integrated into a door of the refrigeration appliance.

Uncooled water, cooled water, sparkling water, ice cubes and/or crushed ice can be dispensed by the ice and water dispenser, for instance.

The container receptacle serves in particular to receive a container, which can receive the dispensed water, ice etc. Such a container may be a glass, a decanter, a drinks bottle etc. The container receptacle can be embodied as a depression or recess, which has in particular a flat base for poisoning the container.

The light projector is configured to project light. This contains a projection of information by use of light radiation. The information can contain at least one graphical element such as a graphical sign (e.g. a symbol, a letter, a digit etc.), at least one abstract geometric object (e.g. a circle, a rectangle etc.) and/or at least one physical object (e.g. a landscape, a scale, ice cube etc.). The information may therefore also contain text. The light can be single-color (e.g. red of blue) and/or multicolor (e.g. white).

The fact that the light projector projects light or light-based information into the container receptacle may mean in particular that it can illuminate at least parts of the container receptacle and objects located therein. The refrigeration appliance can contain one or a number of light projectors for radiating light into the container receptacle.

In one development, the light projector is disposed on the ice and water dispenser and in particular its light radiates directly into the container receptacle (and not from the outside through an opening at the front of the container receptacle).

In one embodiment, the light projector is provided to project light on the ceiling side of the container receptacle. This is advantageous in that the light radiated by the light projector can be projected particularly uniformly across a width of the container receptacle. Moreover, this allows a lower spatial area of the container receptacle, which is particularly visible to a user, to be irradiated very brightly and with uniform intensity over a wide area. Furthermore, a light beam opening into the container receptacle can be concealed particularly reliably from a user. Alternatively or in addition a light projector can be arranged laterally.

In another embodiment the light projector is a laser projector. A laser projector is advantageous in that on account of the narrow and minimally divergent laser beams, the beam generated thereby is particularly sharp, namely also when the angles of incidence of at least one laser beam radiated thereby are not constant or are also very slanted on a projection surface. A particularly high image sharpness can therefore be achieved using a laser projector even on uneven and/or significantly slanted projection surfaces. Moreover, the laser beam does not require complicated optics for beam focusing and can be configured in a particularly compact manner. In particular, the laser projector can project the laser light in a focus-free manner.

In a further embodiment, the light projector is provided to project information onto a side wall of the container receptacle. This is advantageous in that a large surface of the receiving container can be used to display the irradiated information. A side wall can be understood for instance to mean a left wall area, a right wall area and/or a rear wall of the container receptacle.

In one development, information in the form of an image of a physical object can be projected onto the side wall of the container receptacle. This can be used, for instance, to display an operational readiness of the ice and water dispenser. A particularly high-quality impression can therefore also be produced. The image can be in particular an emotional image or "mood image". A mood image can be used to generate an impression quality, e.g. an atmosphere or ambiance, which can only be displayed verbally with difficulty or inaccurately. Information projected onto a side wall is moreover particularly suited to illuminating the container receptacle.

In one development, the mood image can be adjusted to a selected output mode. In particular, the mood image can then reproduce the form of the water type selected by the output mode (plain water, sparkling water, ice cube, crushed ice etc.).

In another further embodiment, a lever switch projects into the container receptacle and the light projector is provided to project information onto the lever switch. Therefore indications to an actuation of the lever switch can be projected hereon, which allows for a particularly easy operability with a particularly high-quality impression. Mood images can also be projected inter alia onto the lever switch, in order to create a particularly high-quality impression. At least one action can be triggered by pressing the lever switch, e.g. an immediate dispensing of water or ice in accordance with an output mode selected previously. When viewed from the front the lever switch is disposed in particular behind the output opening and can be actuated by contact with a container, for instance.

In a further embodiment, the lever switch has a plate-like actuation area and the light projector is provided to project information onto a face of the actuation area. Advantageously a particularly large projection surface is achieved. This face can also be used as an actuation or contact side for actuating the lever switch. The information can be text and/or a mood image, for instance.

In another embodiment, the light projector is provided to project information onto a base of the container receptacle. Such information is advantageously particularly easily visible to a user. This embodiment is advantageous because the light projection does not respond sensitively to moisture in the container receptacle, but a base is frequently moist. An arrangement of a monitor and/or of physical switches on or in the base of the container receptacle must, by contrast, be extensively protected against moisture. Furthermore, a light projection is insensitive to mechanical loads, which are frequently exerted onto the base, e.g. by positioning a container.

Moreover, in one embodiment the refrigeration appliance has a presence detector which operates in a contact-free manner for detecting a position of objects in the container receptacle.

In one development, the presence detector which operates in a contact-free manner is or has a camera. As a result, an object can be recognized particularly accurately, in particular a position of an object can be determined. The camera can be connected to an evaluation facility. The object recognition can also comprise recognizing a type of object, e.g. a container, a hand, a finger etc. Alternatively or in addition to the camera, an IR sensor, a photo sensor etc. can be used as a presence detector.

In one development, the refrigeration appliance is also able, by means of the presence detector, to detect a direction of movement and possibly a motion speed of an object disposed in the container receptacle or in the vicinity thereof.

In another embodiment, the refrigeration appliance is set up to recognize, using the presence detector, a presence of an object in a vicinity of a projected selection information as an actuation of the projected selection information and is configured to carry out an action adapted to the actuated selection information upon recognition of an actuation. As a result, a virtual operator panel can be provided in the container receptacle. Such a virtual operator panel manages without electrical cabling on the projection surface and can therefore be realized in a particularly robust (in particular insensitive to moisture), space-saving and moreover cost-effective manner. Selection information can be understood to mean in particular information which can be used by a user to select an operating parameter or to carry out a specific action.

An area in a vicinity of a projected item of selection information, within which an object triggers an actuation, can also be referred to as a "virtual" field of activity. The field of activity can be operated analogously to a button, a slider, a gesture control, etc. The selection information can then be projected analogously to a labeling of the virtual operator panel or field of activity, in particular entirely into an associated field of activity. A number of virtual fields of activity can together also be referred to as a virtual operating area. The virtual operating area can also have pure display fields, upon which information is projected, to which however no actuation function is assigned.

Moreover, in one embodiment the light projector is set up to project a plurality of selection information adjacent to one another into the container receptacle by means of the one light projector. This facilitates operability, particularly since associated fields of activity can then likewise be adjacent to one another.

In one development which is advantageous for easy recognition and operability of a virtual field of activity, the plurality of selection information or the associated fields of activity are arranged adjacent to one another on a front border area of a base of the container receptacle.

Also in another embodiment, the selection information comprises or displays various output modes, e.g. in accordance with the various output forms of water such as "uncooled water", "cooled water", "ice cubes" or crushed ice" etc. As a result, corresponding virtual fields of activity can be provided for particularly simple operability. Another virtual field of activity can correspond e.g. to a "start" button for dispensing the water, for instance instead of or in addition to a lever switch.

In general, however, selection information and possibly corresponding fields of activity can also be provided to monitor the ice and water dispenser, e.g. a field of activity for displaying maintenance information and an associated display field.

In another embodiment, the light projector is set up to project at least one item of target information in particular onto a base of the container receptacle. This supports a user when correctly positioning a container in the container receptacle. An item of target information can therefore be information which facilitates a positioning of a container, in particular its centering below an output opening. The target information can therefore also be referred to as a centering aid, positioning aid or positioning information.

In one development, the target information is projected in the form of a cross line or a ring. A projection of a ring has the advantage that with its help a cross-section, in particular a diameter, of a jet or volume of the dispensed water or ice, can be estimated. In particular, the ring can have a diameter, which corresponds at least approximately to a typical diameter of a jet or volume of the dispensed water or ice. The ring has the further advantage in that upon projection onto a container disposed in the container receptacle, it can be easily recognized and used particularly easily as a centering aid.

In a particularly advantageous embodiment, at least one output opening for water and/or ice projects or leads into the top of the container receptacle and an item of target information can be projected by means of the light projector below at least one output opening onto a base of the container receptacle.

In another embodiment, the refrigeration appliance has different output openings arranged adjacent to one another for a number of output modes and is configured to project an item of target information adapted to the actuated output mode into the container receptacle upon recognition of an actuation of an output mode. This is particularly advantageous in order to support a user in finding the position within the container receptacle which is correct for a specific output mode (e.g. water or ice). In this embodiment, account is taken of it being possible for different output openings to be provided for water and ice, for instance. Particularly for containers with narrow necks, it may then be difficult to fill these from the output opening of the selected output mode without spillage or overflow.

In one development, the target information can be adjusted to a position and/or a size (e.g. to a diameter) of an output opening of the actuated or selected output mode. A diameter of a ring projected as target information can be larger when an ice dispenser is selected than when a water dispenser is selected.

The ice and water dispenser can essentially be operated without conventional control panels arranged adjacent to the container receptacle in a front panel of the door. In particular, it is possible to dispense with conventional control panels. Alternatively, a conventional control panel can also still be present for operating the ice and water dispenser.

The object is also achieved by a method for operating a refrigeration appliance, in which information is projected into a container receptacle of an ice and water dispenser by means of a light projector. The method can be embodied analogously to the refrigeration appliance and has the same advantages.

The above-described properties, features and advantages of this invention and the manner in which these are achieved will become more clearly and easily intelligible in connection with the following schematic description of an exemplary embodiment, which is explained in more detail with reference to the drawings.

Other features which are considered as characteristic for the invention are set forth in the appended claims.

Although the invention is illustrated and described herein as embodied in a refrigeration appliance with an ice and water dispenser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2A is a sectional side view of a cutout from the refrigeration appliance in an area of the ice and water dispenser;

FIG. 2B is a front view of the ice and water dispenser of the refrigeration appliance with a first light projection;

FIG. 2C is a front view of the ice and water dispenser of the refrigeration appliance with a second light projection.

DETAILED DESCRIPTION OF THE INVENTION

Figure 1:
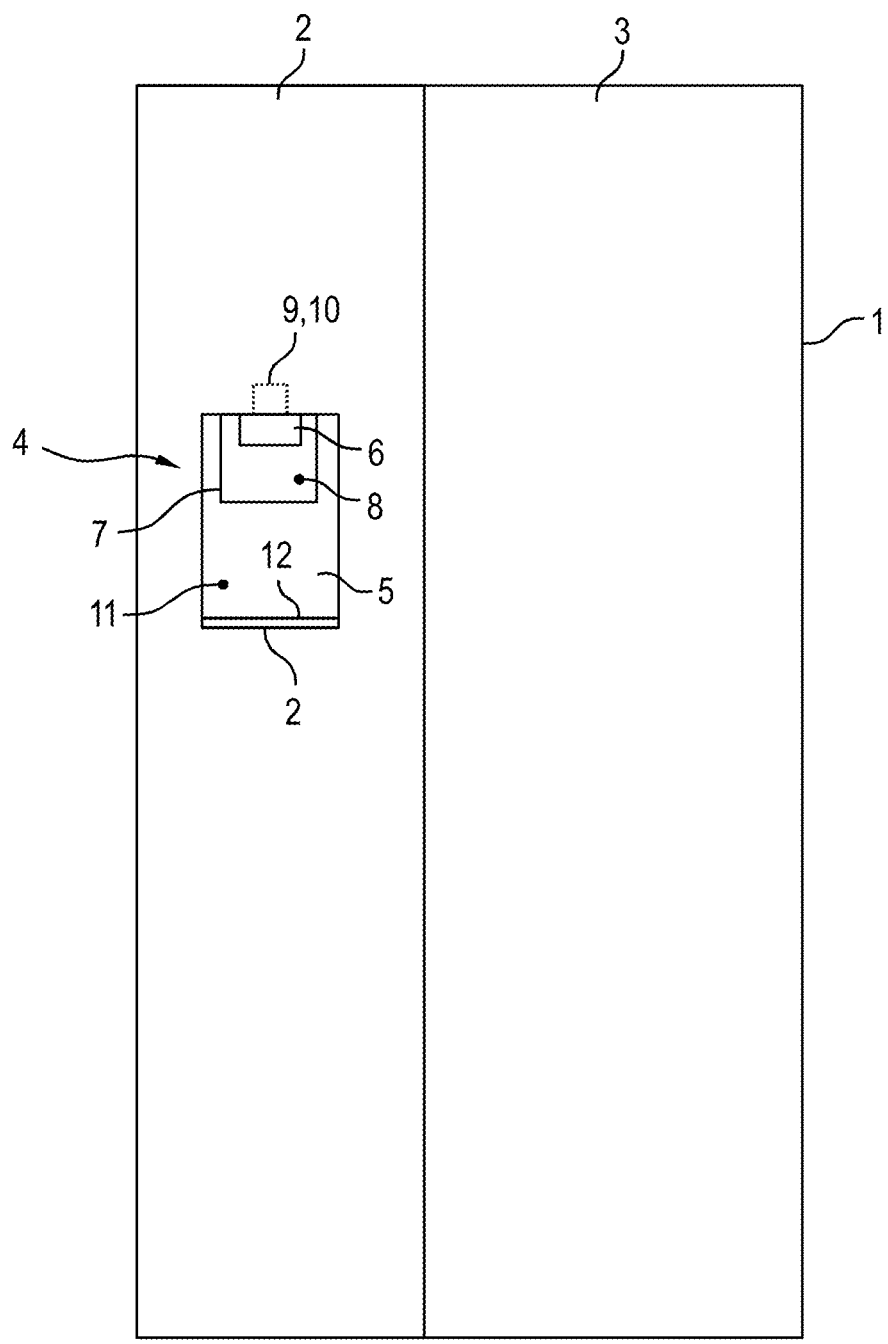
FIG. 1 is a diagrammatic, front view of a refrigeration appliance with an ice and water dispenser according to the invention.

Referring now to the figures of the drawings in detail and first, particularly to FIG. 1 thereof, there is shown a front view of a refrigeration appliance in the form of a dual refrigerator 1 with refrigerating zones which are arranged adjacent to one another and can be closed by respective doors 2, 3. An ice and water dispenser 4 is disposed in the door 2. FIG. 2A shows a cutout from the dual refrigerator 1 in the area of the ice and water dispenser 4 as a sectional view from the side.

The ice and water dispenser 4 has a container receptacle 5 which can be accessed from the front. In the region of a ceiling of the container receptacle 5, an output opening 6 for water and/or ice leads into the container receptacle 5. To the rear of the output opening 6 a lever switch 7 projects into the container receptacle 5 from above. The lever switch 7 there has a plate-like operating area, which is aligned frontally with its face 8.

The dual refrigerator 1 also has a light projector in the form of a laser projector 9 for projecting information into the container receptacle 5. The laser projector 9 can irradiate laser light L into the container receptacle 5 on the ceiling side, in particular within the lighting area shown with a dashed line. The laser projector 9 is in particular able to project light as information into the container receptacle 5.

The dual refrigerator 1 moreover has a presence detector 10, which operates in a contact-free manner, for detecting a position of objects in the container receptacle 5. The sensor or detector 10, for instance a camera-based detector with the ability to recognize objects, is integrated here, by way of example with the laser projector 9, in a projection/detector module 9, 10.

A user can fill a container (not shown) with ice or water, for instance, as a result, by selecting an output mode e.g. ice cube and then using the container pressing the lever switch 7 backward in the direction of a rear wall 11 of the container receptacle 5. The lever switch 7 is actuated as a result and triggers a dispensing of ice cubes (not shown). The container can be placed on a base 12 in the container receptacle 5.

FIG. 2B shows a front view of the ice and water dispenser 4 of the dual refrigerator 1 with a first light projection. The first light projection is present in the form of an item of information IF1, which is projected onto the rear wall 11 of the container receptacle. Information IF1 is configured as an image of a concrete object, here namely a group of ice cubes. The information IF1 can be used as a mood image, for instance, if the ice and water dispenser 4 is switched on. Information IF1 can be indicated as a group of many ice cubes irrespective of the output mode currently selected or change with the output mode currently selected. No actuation function is assigned to the information IF1.

FIG. 2C shows a front view of the ice and water dispenser 4 with a second light projection. The second light projection is present in the form of an item of information IF2, which is projected onto the face 8 of the operating area of the lever switch 7.

The information IF2 has a partial image IF2a which is configured as an image of a concrete object, here namely a group of three ice cubes. This partial image IF2a can be used as a mood image. In addition, the information IF2 contains a text IF2b "XYZ". The text IF2b can assist a user with operating the ice and water dispenser 4. To this end, the text IF2b can read "press".

The partial image IF2a can be indicated as a group of ice cubes irrespective of the output mode currently selected or changes with the output mode currently selected. For instance, when the output mode "sparkling water" is selected, the partial image IF2a can indicate an image with sparkling water. The text IF2b can be retained in the process. No actuation function is assigned to the information IF2.

The information IF2 can be indicated simultaneously with the information IF1, but this is not necessary.

Figure 3:
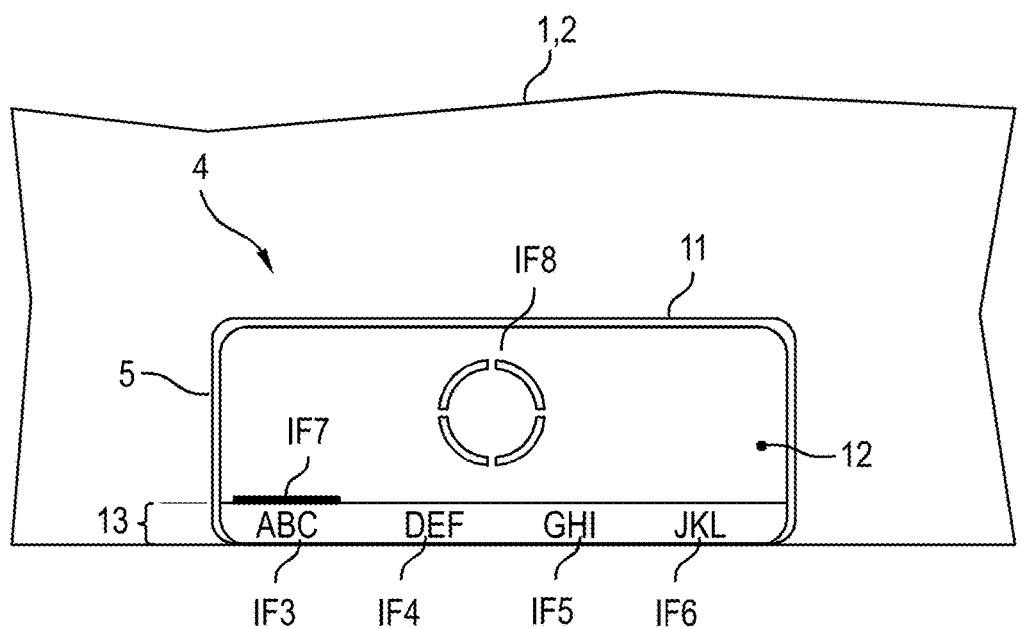
FIG. 3 is a top view onto a base of the ice and water dispenser of the refrigeration appliance with further light projections.

FIG. 3 shows a top view of the base 12 of the ice and water dispenser 4 of the dual refrigerator 1 with further light projections. The further light projections are present in the form of information IF3 to IF8 and can also only be indicated individually or in subgroups. The information IF3 to IF8 can be displayed simultaneously with the information IF1 and/or IF2, but this is not necessary.

The information IF3 to IF6 represents texts for various output modes, namely for instance ABC="ice cubes", DEF="crushed ice", GHI="water" and JKL="bottle filling" or "sparkling water". The information IF3 to IF6 therefore represents selection information.

A presence of an object in a vicinity of a projected item of selection information IF3 to IF6, e.g. a position of a finger, can be defined by use of the presence detector 10. If the finger is inter alia positioned sufficiently close to one of the items of selection information IF3 to IF6, this is recognized or assessed as an actuation of the projected selection information IF3 to IF6. To this end the projection/detector module 9, 10 can be provided or coupled with an evaluation facility, for instance, with a control facility (not shown) of the dual refrigerator 1, for instance.

The dual refrigerator 1 is set up to carry out an action adapted to the selection information IF3 to IF6 actuated, upon recognition of such an actuation, e.g. to set a current output mode to the output mode linked with the selection information IF3 to IF6 actuated (in other words e.g. "ice cubes", "crushed ice", "water" or "bottle filling" or "sparkling water"). An additional action may be a change in the partial image IF2a.

For simple actuation of the selection information IF3 to IF6, or the virtual fields of activity associated with the selection information IF3 to IF6, the selection information IF3 to IF6 is projected onto the base 12 of the container receptacle 5 adjacent to one another. For simple operability even with an occupied container receptacle 5, the selection information IF34 to IF6 is projected adjacent to one another on a front border area 13 of the base 12.

A further item of information IF7 is present in the form of an illuminating bar, the position of which specifies the current output mode.

A further item of information is present in the form of target information IF8, which is configured here as a circle which is repeatedly open. The target information IF8 is centered vertically with respect to the output opening 6, and can therefore be projected below the output opening 6 onto the base 12 of the container receptacle 5. In the case of several output openings the position and/or the size of the target information IF8 can be dependent on the position and/or size of the output opening selected.

Naturally, the present invention is not restricted to the exemplary embodiment disclosed.

In general, "a", "one" etc. can be regarded as a singular or a plurality, in particular in the sense of "at least one" or "one or more" etc., as long as this is not explicitly excluded, e.g. by the expression "precisely one" etc.

In addition, a given number can include precisely the number given and also a conventional tolerance range, as long as this is not explicitly excluded.

The following is a summary list of reference numerals and the corresponding structure used in the above description of the invention:

1 Dual refrigerator
2 Door
3 Door
4 Ice and water dispenser
5 Container receptacle
6 Output opening
7 Lever switch
8 Face of the lever switch
9 Laser projector
10 Presence detector
11 Rear wall of the container receptacle
12 Base of the container receptacle
IF1 Information
IF2 Information
IF2a Partial image
IF2b Text
IF3-IF6 Selection information
IF7 Information
IF8 Target information
L Laser light

The invention claimed is:

1. A refrigeration appliance, comprising:
 an ice and water dispenser having a container receptacle;
 a light projector for projecting information into said container receptacle; and
 a lever switch projecting into said container receptacle and said light projector projecting the information onto said lever switch.

2. The refrigeration appliance according to claim 1, wherein said light projector projects light from a ceiling side into said container receptacle.

3. The refrigeration appliance according to claim 1, wherein said light projector is a laser projector.

4. The refrigeration appliance according to claim 1, wherein said container receptacle has a side wall and said light projector projects the information onto said side wall of said container receptacle.

5. The refrigeration appliance according to claim 1, wherein said lever switch has a plate-shaped operating area and said light projector projects the information onto a face of said plate-shaped operating area.

6. The refrigeration appliance according to claim 1, wherein said container receptacle has a base and said light projector projects the information onto said base of said container receptacle.

7. A refrigeration appliance, comprising:
   an ice and water dispenser having a container receptacle;
   a light projector for projecting information into said container receptacle; and
   a presence detector operating in a contact-free manner for detecting a position of objects in said container receptacle and set up to recognize a presence of the object in a vicinity of projected selection information as an actuation of the projected selection information using said presence detector and set up to carry out an action adapted to actuated selection information upon recognition of an actuation.

8. The refrigeration appliance according to claim 7, wherein the refrigeration appliance is set up to project a plurality of the projected selection information adjacent to one another into said container receptacle by means of said light projector.

9. The refrigeration appliance according to claim 7, wherein the projected selection information contains various output modes.

10. The refrigeration appliance according to claim 7, wherein:
    said container receptacle has a base and said light projector projects the projected selection information onto said base of said container receptacle; and
    said light projector is set up to project at least one item of target information onto said base of said container receptacle.

11. The refrigeration appliance according to claim 10, wherein said container receptacle has a top and at said top at least one output opening is formed therein and projects into said container receptacle and the target information can be projected by means of said light projector onto said base of said container receptacle below said at least one output opening.

12. The refrigeration appliance according to claim 7, wherein the refrigeration appliance:
    has different output openings formed therein which are disposed adjacent to one another for several output modes; and
    is set up to project an item of target information, adapted to an actuated output mode, into said container receptacle by means of said light projector upon recognition of an actuation of an output mode.

* * * * *